H. P. RHEES, G. FARBRO, AND E. STEVENS.
SUCKER ROD SOCKET.
APPLICATION FILED SEPT. 22, 1920.
1,434,632.
Patented Nov. 7, 1922.
3 SHEETS—SHEET 2.
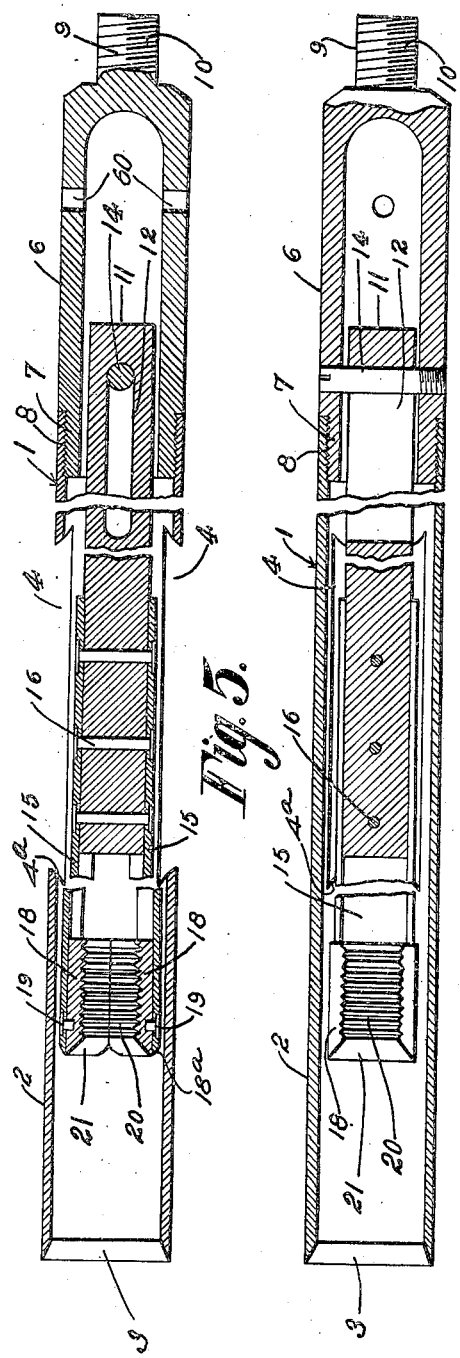
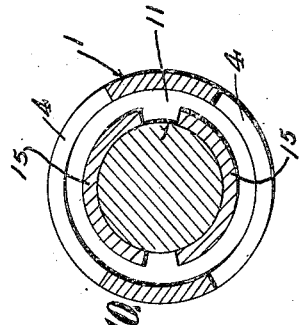
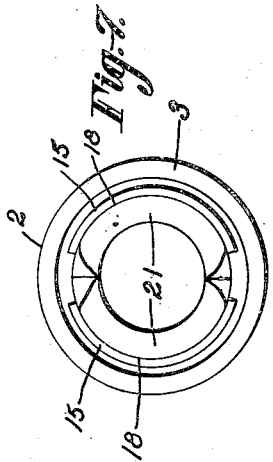
Inventors
H. P. RHEES,
G. FARBRO,
E. STEVENS.
Attorneys H. P. RHEES, G. FARBRO, AND E. STEVENS.
SUCKER ROD SOCKET.
APPLICATION FILED SEPT. 22, 1920.
1,434,632.
Patented Nov. 7, 1922.
3 SHEETS—SHEET 3.
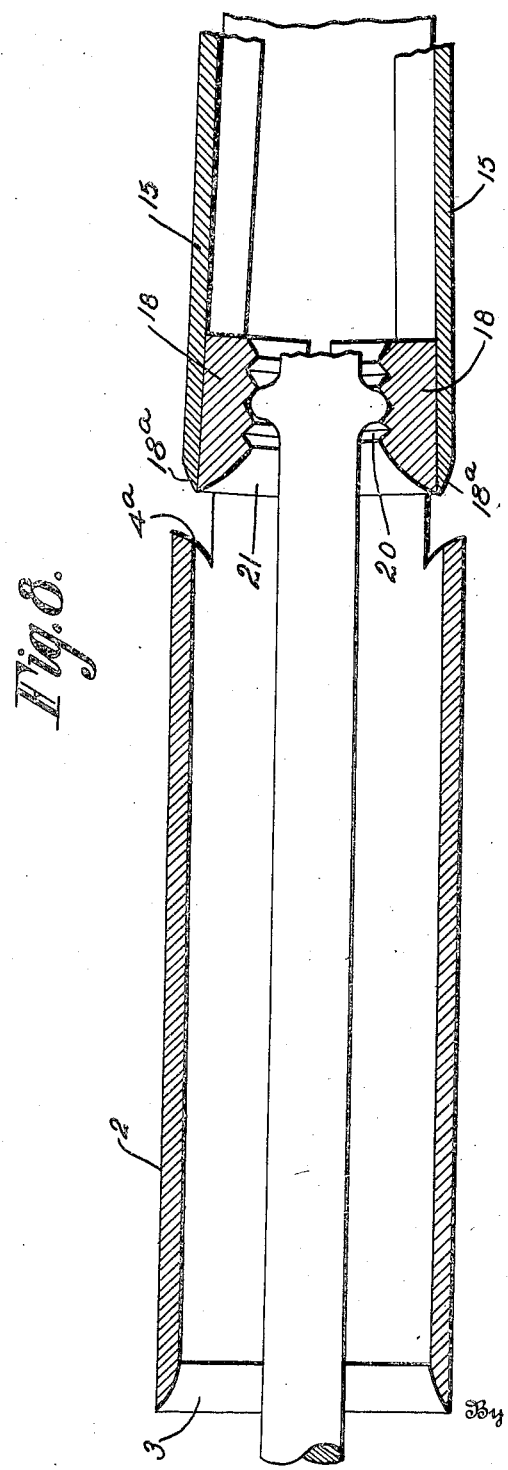
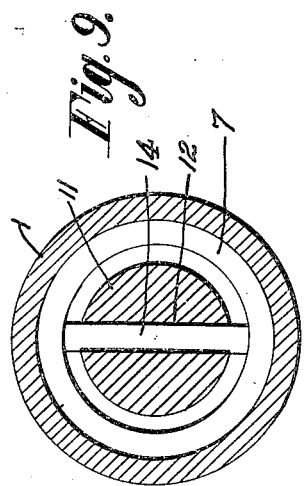
Inventors
H.P.RHEES,
G.FARBRO,
E.STEVENS.
By C.A.Snow & Co.
Attorneys Patented Nov. 7, 1922.

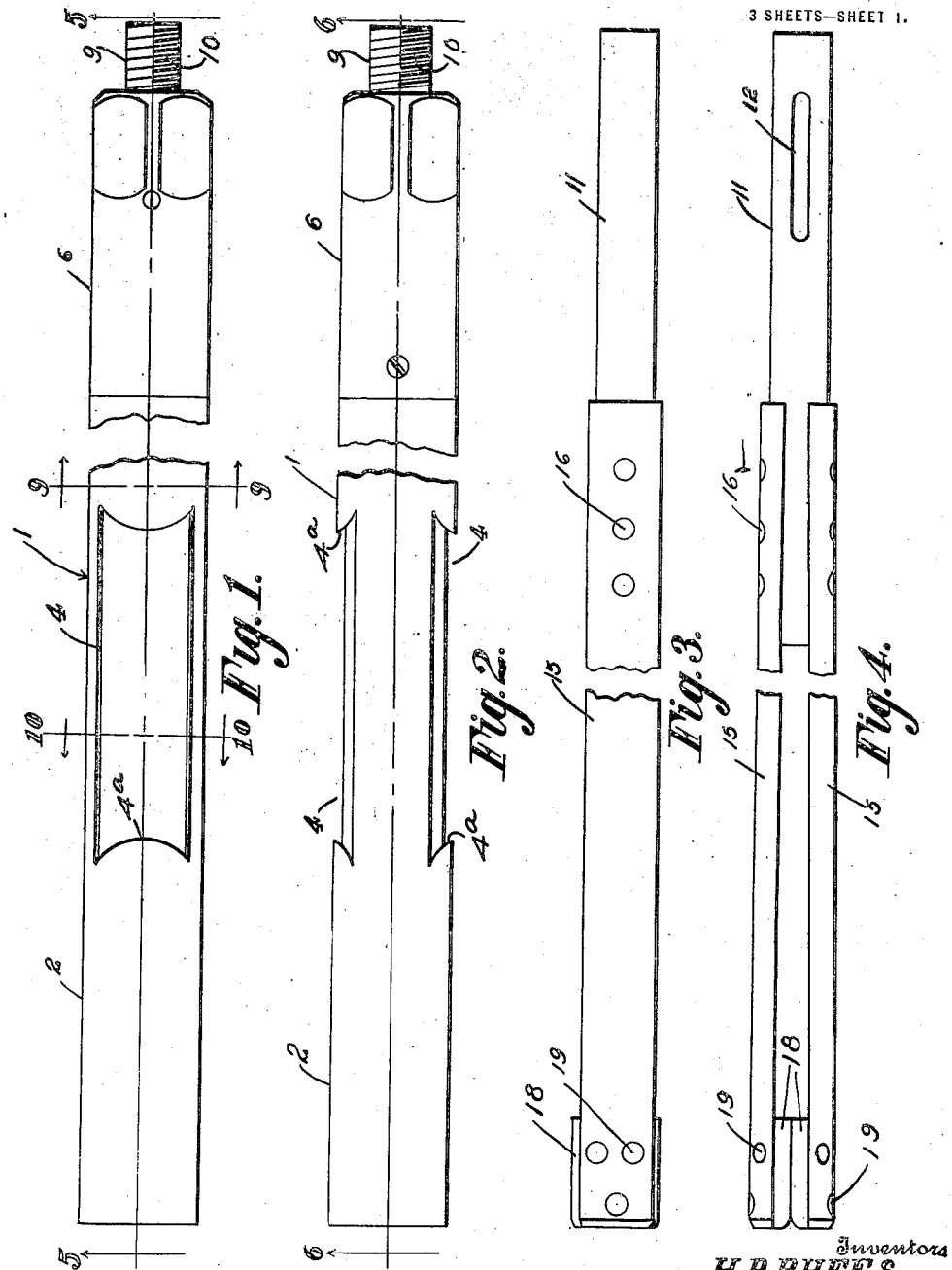

1,434,632

UNITED STATES PATENT OFFICE.

HERBERT P. RHEES, GEORGE FARBRO, AND EDWARD STEVENS, OF DRUMRIGHT, OKLAHOMA.

SUCKER-ROD SOCKET.

Application filed September 22, 1920. Serial No. 412,106.

*To all whom it may concern:*

Be it known that we, HERBERT P. RHEES, GEORGE FARBRO, and EDWARD STEVENS, citizens of the United States, residing at Drumright, in the county of Creek, State of Oklahoma, have invented a new and useful Sucker-Rod Socket, of which the following is a specification.

The device forming the subject matter of this invention is adapted to be employed for fishing broken sucker rods out of wells, and the invention aims to provide novel means whereby the sucker rod section may be gripped and held during the removal thereof.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts being broken away;

Figure 2 is a side elevation, the device being viewed at right angles to the showing of Figure 1;

Figure 3 is an elevation showing the plunger;

Figure 4 is an elevation wherein the opposite side of the plunger appears from that shown in Figure 3;

Figure 5 is a longitudinal section taken on the line 5—5 of Figure 1;

Figure 6 is a longitudinal section taken on the line 6—6 of Figure 2;

Figure 7 is an end elevation;

Figure 8 is an enlarged longitudinal section;

Figure 9 is a cross section on the line 9—9 of Figure 1; and

Figure 10 is a cross section on the line 10—10 of Figure 1.

The device constituting this invention comprises a body, denoted generally by the numeral 1 which is a composite structure and includes a tube 2, the bore of which is flared, as indicated at 3, at the working end of the tube. Side slots 4 are fashioned in the tube 2 and are elongated in the direction of the length of the tube. The body 1 comprises a hollow head 6 having a reduced neck 7 threaded at 8 into one end of the tube 2. The head 6 has a reduced tip 9, which may be threaded as shown at 10 for engagement with any suitable means whereby the device may be raised and lowered.

A plunger 11 is mounted for limited longitudinal movement within the body 1. The plunger 11 is provided with an elongated slot 12, through which passes a cross pin 14, the cross pin as shown being in the form of a screw, and being mounted in the head 6. Oppositely disposed spring arms 15 are attached by securing elements 16 to the plunger 11. Oppositely disposed jaws 18 are attached by securing elements 19 to the spring arms 15. In cross section, the jaws 18 are trough-shaped. The jaws 18 are shown as being corrugated internally, but this corrugation, shown at 20 need not be insisted upon. As a matter of fact, the jaws may be constructed in any desired way, depending on the nature of the object which is to be fished out of the well. The head 6 may be threaded out of the tube 2, the screw 14 may be removed, and one plunger 11 may be substituted for another, the plungers having jaws which are shaped to conform to the particular work in hand. The jaws 18 are flared as indicated at 21, at their ends, to form a mouth.

In practical operation, when the device is lowered into a well, the pin 14 is at the upper end of the slot 12, the plunger 11 being suspended on the pin as shown in Figs. 5 and 6. Ultimately, the end of the broken sucker rod is guided by the flared portion 3 of the tube 2 into the tube and is guided by the flared portions 21 of the jaws 18, against or into the jaws. The continued downward movement or lowering of the tool with the jaws 18 bearing on the rod to be removed causes the tube 1 to move relatively to plunger 11 until the pin 14 arrives at the lower end of the slot 12 and stops the relative movement of the tube to the plunger. The slot 12 is of such a length that, when the movement of the tube relative to the plunger is stopped, as aforesaid, the free ends of the spring arms 15 and the jaws 18, are opposite to the side slots 4 in the tube 2. The arms 15 may then expand outwardly through the slots, the jaws 18 spreading to receive the portion of the broken sucker rod between them, and the jaws caused to grip the sucker rod, due to the resilience of the arms 15. The outward or upward movement of the tool will cause tube 2 to move on plunger 11 a distance equal to the length of slot 12, thereby drawing the unslotted lower end of the tube 2 up over the jaws 18 with the sucker rod clasped between them, and thereby holding said jaws reliably engaged with the rod and the entire device may then be lifted out of the well, carrying with it the broken portion of the sucker rod. It will thus be obvious that the cooperating beveled edges 18$^a$ of the jaws 18 and the slot ends 4$^a$ will insure a smooth passage of the tube over the rod carrying jaws when the tool is moved upwardly.

The pin 14 is at the upper end of the slot 12 in the plunger 11, during the lowering of the device, and the free ends of the spring gripping members or arms 15 are located between the working end of the tube 2 and the adjacent ends of the side slots 4. The free ends of the arms, therefore, cannot catch on the tubing, whilst the device is being lowered into the well.

If desired, the head 6 may be supplied with openings 60, permitting the exit of any foreign matter which may find its way into the head, above the upper end of the plunger 11.

Having thus described the invention, what is claimed is:—

1. In a tool of the class described, a tube having longitudinally extending diametrically opposite openings in its side walls and with its tool engaging end flared to facilitate its engagement with the tool and with its other end internally threaded, a hollow head having one end reduced and externally threaded for insertion in said threaded tube end, a cross rod in said head, a longitudinally slotted plunger slidable in said head with the cross rod in the head extending through the slot in the plunger, spring clamping arms secured at one end to the opposed faces of said plunger, gripping jaws carried by said arms and being trough-shaped in cross section and having flared mouths, and means to facilitate the return of the jaws to the tube after they have gripped the object to be removed thereby.

2. In a tool of the class described, a tube having longitudinally extending openings in its side walls, the end walls of said openings being under cut or beveled and curved transversely of the openings, a plunger slidable in said tube, means for limiting the relative movement of the plunger to the tube, spring clamping arms secured at one end to the opposed faces of said plunger, gripping jaws carried by the free ends of said arms and having their outer faces beveled to cooperate with the beveled edges of the openings in the tube to insure the free sliding of the jaws into the tube after they have been engaged with the object to be clamped thereby.

In testimony that we claim the foregoing as our own, we have hereto affixed our signatures in the presence of two witnesses.

HERBERT P. RHEES.
GEO. FARBRO.
EDWARD STEVENS.

Witnesses:
Geo. Stow,
H. C. Butler.